United States Patent
Chung et al.

(10) Patent No.: US 12,430,471 B2
(45) Date of Patent: Sep. 30, 2025

(54) METHOD AND SYSTEM FOR VERIFICATION OF END-TO-END DATA INTEGRITY DURING BIG DATA TRANSFER

(71) Applicant: AJOU UNIVERSITY INDUSTRY-ACADEMIC COOPERATION FOUNDATION, Suwon-si (KR)

(72) Inventors: Tae-Sun Chung, Seongnam-si (KR); Preethika Anand Rao Kasu, Yongin-si (KR)

(73) Assignee: Ajou University Industry-Academic Cooperation Foundation, Suwon-si (KR)

( * ) Notice: Subject to any disclaimer, the term of this patent is extended or adjusted under 35 U.S.C. 154(b) by 252 days.

(21) Appl. No.: 18/476,157

(22) Filed: Sep. 27, 2023

(65) Prior Publication Data
US 2024/0111906 A1 Apr. 4, 2024

(30) Foreign Application Priority Data
Sep. 28, 2022 (KR) .................. 10-2022-0123284

(51) Int. Cl.
G06F 21/64 (2013.01)
G06F 16/13 (2019.01)
H04L 9/40 (2022.01)

(52) U.S. Cl.
CPC ............ G06F 21/64 (2013.01); G06F 16/137 (2019.01); H04L 63/12 (2013.01)

(58) Field of Classification Search
CPC ...... G06F 21/64; G06F 21/645; G06F 16/137; H04L 63/12; H04L 63/123; H04L 63/126
See application file for complete search history.

(56) References Cited

U.S. PATENT DOCUMENTS

| | | | |
|---|---|---|---|
| 2005/0251682 A1* | 11/2005 | Collins | G06F 21/64 713/176 |
| 2018/0025181 A1* | 1/2018 | Barinov | G06F 21/645 726/26 |

(Continued)

FOREIGN PATENT DOCUMENTS

KR 10-2011-0028968 A 3/2011

OTHER PUBLICATIONS

Kasu et al., "TPDF: Two-Phase Bloom-Filter-Based End-to-End Data Integrity Verification Framework for Object-Based Big Data Transfer Systems", Mathematics, May 7, 2022, 10 ,1591, in 25 pages.

(Continued)

*Primary Examiner* — Malcolm Cribbs
(74) *Attorney, Agent, or Firm* — Knobbe, Martens, Olson & Bear, LLP

(57) ABSTRACT

The present disclosure relates to a method and system for verifying end-to-end data integrity during big data transfer, and includes transferring, with a source node, at least one data set to a sink node; verifying, with the sink node, integrity of at least one object comprised in the data set based on a data and layer-aware Bloom filter (DLBF); verifying, with the sink node, integrity of at least one file comprised in the data set based on a two-phase Bloom filter (TPBF); and verifying, by the sink node, integrity of the data set based on the integrity verification of the object and the file, and can be applied to other embodiments.

19 Claims, 5 Drawing Sheets

(56) References Cited

U.S. PATENT DOCUMENTS

| | | | | |
|---|---|---|---|---|
| 2018/0219871 A1* | 8/2018 | Amin | .................... | H04L 63/123 |
| 2019/0207766 A1* | 7/2019 | Sanghvi | ................ | H04L 9/3239 |
| 2019/0386817 A1* | 12/2019 | Carson | .................. | H04L 9/0643 |
| 2021/0211286 A1* | 7/2021 | Lam | ........................ | H04L 67/12 |
| 2022/0253430 A1* | 8/2022 | Paul | .................... | G06F 16/2255 |
| 2022/0300452 A1* | 9/2022 | Diehl | .................... | H04L 9/3247 |

OTHER PUBLICATIONS

Office Action issued in Korean Application No. 10-2022-0123284 dated Mar. 14, 2025.

Kaus et al., "DLFT: Data and Layout Aware Fault Tolerance Framework for Big Data Transfer Systems", IEEE Access, vol. 9, Feb. 1, 2021.

Yu et al., "Finding Needles in a Haystack: Missing Tag Detection in Large RFID Systems" IEEE Transactions on Communications, vol. 65, Issue: 5, May 2017.

* cited by examiner

METHOD AND SYSTEM FOR VERIFICATION OF END-TO-END DATA INTEGRITY DURING BIG DATA TRANSFER

CROSS-REFERENCE TO RELATED APPLICATION

This application claims priority to and the benefit of Korean Patent Application No. 10-2022-0123284 entitled "METHOD AND SYSTEM FOR VERIFICATION OF END-TO-END DATA INTEGRITY DURING BIG DATA TRANSFER," filed on Sep. 28, 2022, the disclosure of which is incorporated herein by reference in its entirety.

FIELD

The present disclosure relates to a method and system for verifying end-to-end data integrity during big data transfer.

BACKGROUND

Typical big data transfer frameworks may ignore the underlying storage system architecture and rely solely on file logical representation. Accordingly, the typical big data transfer frameworks transfer the objects of the same file in a sequence. When a single I/O thread is assigned to transfer the file, it will work on that file sequentially until the entire file is transferred.

As only one file is transferred at a time, the big data transfer frameworks have a problem in that it consumes a considerable amount of time to transfer all the files in the dataset. To improve the data transfer performance, it is possible to assign multiple I/O threads to process the data transfer. However, employing multiple I/O threads without knowledge of the physical distribution of the file might result in storage contention issues as multiple threads compete for the same object storage server (OSS) or object storage target (OST).

Due to this storage contention issue, the data transfer performance can be degraded.

As described above, a technology for solving storage contention issues has been developed by considering the physical distribution of the files across different OSTs using an object-based big data transfer systems, unlike the conventional big data transfer framework. However, the technology also uses a complex scheduling algorithm to prevent the same storage contention issues from occurring. Therefore, there is a need for an integrity verification framework for verifying the integrity of end-to-end data without high specification storage or complex scheduling algorithms. The disclosure of this section is to provide background information relating to the present disclosure. Applicant does not admit that any information contained in this section constitutes prior art.

SUMMARY

According to one or more embodiments of the present disclosure, a method and system for verifying of end-to-end data integrity during big data transfer may be performed in order to verify data integrity during end-to-end data transfer by applying a two-phase Bloom filter (TPBF).

According to one or more embodiments of the present disclosure, a method for verifying end-to-end data integrity during big data transfer, the method may include: transferring, with a source node, at least one data set to a sink node; verifying, with the sink node, integrity of at least one object comprised in the data set based on a data and layer-aware Bloom filter (DLBF); verifying, with the sink node, integrity of at least one file comprised in the data set based on a two-phase Bloom filter (TPBF); and verifying, by the sink node, integrity of the data set based on the integrity verification of the object and the file.

In addition, verifying the integrity of the at least one object may include: computing, with the sink node, a hash value of the object using a hash function; and comparing, with the sink node, the computed hash value with a hash value computed in the source node.

In addition, the method may further include requesting, with the sink node, the source node to re-transfer the object when the hash values are different from each other.

In addition, the method may further include verifying, with the sink node, the integrity of the object when the hash values are the same.

In addition, the method may further include: updating, with the sink node, the DLBF when the hash values are the same; and updating, with the source node, the DLBF when the hash values are the same.

In addition, verifying the integrity of the at least one file may further include: computing, with the sink node, a hash value of a file level from the DLBF; and comparing, with the sink node, the computed hash value of the file level with a hash value of a file level computed in the source node.

In addition, the method may further include requesting, with the sink node, the source node to re-transfer the file when the hash values of the file level are different from each other.

In addition, the method may further include verifying, with the sink node, the integrity of the file when the hash values of the file level are the same.

In addition, the method may further include: updating, with the sink node, the DLBF when the hash values of the file level are the same; and updating, with the source node, the DLBF when the hash values of the file level are the same.

In addition, verifying the integrity of the data set may further include: computing, with the sink node, a hash value of a data set level from the TPBF; and comparing, with the sink node, the hash value of the computed data set level with a hash value of a data set level computed in the source node.

In addition, the method may further include: requesting, with the sink node, the source node to re-transfer the data set when the hash values of the data set level are different from each other.

In addition, the method may further include verifying, with the sink node, the integrity of the at least one data set when the hash values of the data set level are the same.

In addition, the system for verifying end-to-end data integrity during big data transfer, one or more embodiments embodiment of the present disclosure may include a source node configured to transfer at least one data set; and a sink node configured to: verify integrity of at least one object comprised in the data set received from the source node based on a data and layer-aware Bloom filter (DLBF) through communication with the source node, verify integrity of at least one file comprised in the data set based on a two-phase Bloom filter (TPBF), and verify integrity of the data set based on the integrity verification of the object and the file.

In addition, the sink node may compare a hash value of the object computed using a hash function with a hash value computed in the source node. In addition, the sink node may request the source node to re-transfer the object when the hash values are different from each other, and verify the integrity of the object when the hash values are the same.

In addition, the sink node may compare a hash value of a file level computed from the DLBF updated with a hash value of a file level computed from the DLBF updated in the source node as the hash values are the same.

In addition, the sink node may request the source node to re-transfer the file when the hash values of the file level are different from each other, and verify the integrity of the file when the hash values of the file level are the same.

In addition, the sink node may compare a hash value of a data set level computed from the TPBF updated with a hash value of a data set level computed from the TPBF updated in the source node as the hash values of the file level are the same.

In addition, the sink node may request the source node to re-transfer the data set when the hash values of the data set level are different from each other, and verify the integrity of the data set when the hash values of the data set level are the same.

As described above, the method and system for verifying end-to-end data integrity during big data transfer according to the present disclosure may have an effect of minimizing storage contention issues and improving data transfer speed by verifying data integrity during end-to-end data transfer by applying a two-phase Bloom filter (TPBF).

DETAILED DESCRIPTION

Figure 1:
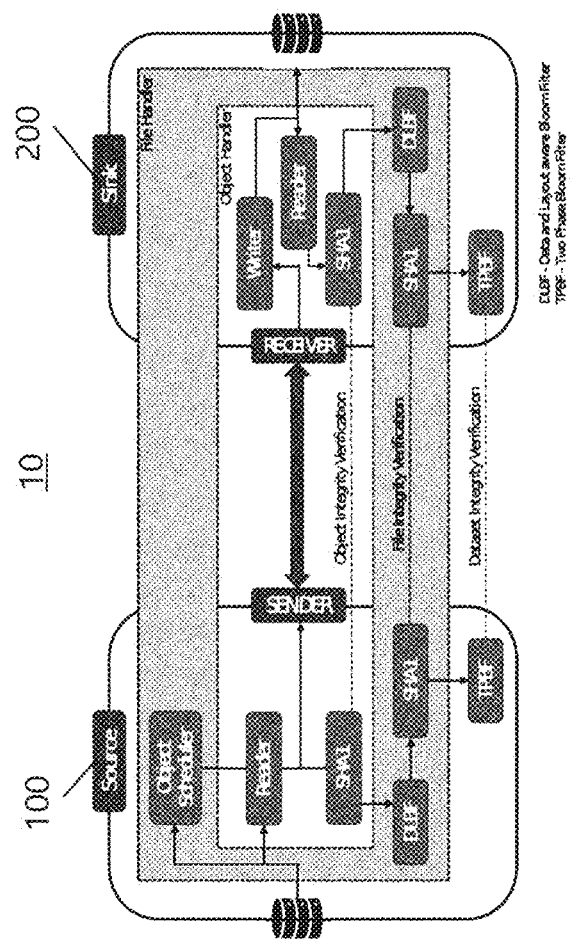
FIG. 1 is a diagram showing a system for data integrity verification according one or more embodiments of the present disclosure.

In the following detailed description, reference is made to the accompanying drawings, which form a part hereof. The illustrative embodiments described in the detailed description, drawings, and claims are not meant to be limiting. In the drawings, similar symbols typically identify similar components unless context dictates otherwise. Thus, in some embodiments, part numbers may be used for similar components in multiple figures, or part numbers may vary from figure to figure. Some embodiments may be utilized, and other changes may be made without departing from the spirit or scope of the subject matter presented In some embodiments. It will be readily understood that the aspects of the present disclosure, as generally described herein and illustrated in the Figures, can be arranged, substituted, combined, and designed in a wide variety of different configurations, all of which are explicitly contemplated and made part of this disclosure.

FIG. 1 is a diagram illustrating a system for verifying data integrity according to one or more embodiments of the present disclosure.

Referring to FIG. 1, a system 10 for verifying data integrity according to one or more embodiments of the present disclosure may include a source node 100 and a sink node 200. The source node 100 may include a sender, a storage, an object scheduler, a reader, a secure hash algorithm 1 (SHA1), a data and layout-aware Bloom filter (DLBF), and a two-phase Bloom filter (TPBF). The sink node 200 may include a receiver, a writer, a reader, a SHA1, a DLBF, and a TPBF. In some embodiments, the reader, the SHA1 of the source node 100, and the writer, the reader, and the SHA1 of the sink node 200 may be collectively referred to as an object handler, which is a core component of the system 10. In addition, the object scheduler, the DLBF, and the SHA1 of the source node 100, and the DLBF and SHA1 of the sink node 200 may be collectively referred to as a file handler, which is a core component of the system 10. Also, a file handler may include an object handler.

In some embodiments, the object handler may process a core task of transferring object-level data (hereinafter, referred to as an object) between the source node 100 and the sink node 200 and integrity management of the object. In addition, the file handler may process a file scheduling for transferring file-level data (hereinafter referred to as a file) between the source node 100 and the sink node 200 and integrity management and operation of the file.

In some embodiments, at least one object may be included in the file, and at least one file may be included in the data set. For data set transfer, the source node 100 may sequentially transfer the object. The object can be the smallest unit of the data set. When data set transfer is started, the file handler of the source node 100 may prepare a list of files to be transferred and reserves the transfer of a file to be sent and an object constituting the file to be sent.

The file handler and the object handler of the sink node 200 may ensure the integrity of the file and the object, respectively. Then, the file handler and the object handler of the sink node 200 may check whether the file and the object are successfully written to a parallel file system (PFS), which is a storage of the sink node 200.

As described above, the DLBF and the TPBF may be used to maintain information on the object and the file successfully transferred in the data set, respectively. For example, the DLBF may be used for successful object transfer and integrity verification. In addition, the TPBF may be used for successful file transfer and integrity verification.

In some embodiments, when a fault occurs during the data set transfer and the transfer is resumed from the fault point, the DLBF and the TPBF may retrieve the successfully transferred files and file(s) objects, respectively. In these embodiments, the successfully transferred objects and files are excluded from the re-transfer, and in the case of remaining objects and files, the file handler of the source node 100 may schedule the re-transfer. The source node 100 may repeatedly perform the corresponding operation until all objects and files in the data set are successfully transferred to the sink node 200 without any integrity error.

The Bloom filter according to one or more embodiments of the present disclosure can be a data structure that supports a constant time insert and query operations. The Bloom filter may be an m-bit vector (B) with k independent hash functions $(h_1, \ldots, h_k)$, that translates every element in a data set $(S=\{x_1, \ldots, x_n\})$ to a range $(R_m=\{0, 1, \ldots, m-1\})$. Every hash function $h_k$ may uniformly map each element in the dataset to a random integer with equal probability across the range $R_m$. All m-bits of bit vector B may be initially set to "0." The Bloom filter may utilize k independent hash functions for inserting an element or for querying the membership of an element. These hash functions can generate k hash values that are uniformly distributed over the range, 1 ... m. When an element is inserted, the bits at these k-positions in the Bloom filter array can be set to 1. When an object membership query is performed, the Bloom filter array values at these k-positions can be compared, and, if any of the bits at these positions is equal to 0, then the element can be presumed to be not present in the set. Otherwise, it may be determined that the element is in the set.

In some embodiments, if any of the bits at these k-positions were set as a result of hash collisions, this assumption can lead to false-positive errors. The probability that an object does not exist in the set, often known as the false-positive error probability, can be calculated by using Equation 1 below. In some cases, for a given number of hash functions, k, and larger m, the probability, p, that a specific bit will remain 0, after all the entries in a dataset have been hashed into the Bloom filter. Further, Equations 1 to 4 shown below can represent equations related to a data structure of the Bloom filter.

$$p = \left(1 - \frac{1}{M}\right)^{kn} \approx \left(e^{-kn/m}\right) \quad (1)$$

As a result, the probability that the bit is 1 may be represented as Equation 2 below.

$$p = 1 - \left(1 - \frac{1}{M}\right)^{kn} \approx \left(e^{-kn/m}\right) \quad (2)$$

While testing the membership of an object that is not present in set, the false-positive error probability ($\epsilon$) may be calculated using Equation 3 below.

$$\epsilon = \left(1 - \left(1 - \frac{1}{m}\right)^{kn}\right)^k \approx \left(1 - e^{-kn/m}\right)^k \quad (3)$$

In addition, the number of objects of dataset (n), hash function (k), and the total filter size (m) may all influence the Bloom filter's false-positive error probability (e). In this case, k would be an integer, and a suboptimal smaller k is preferable since it minimizes the number of hash functions to be computed and thus reduces the overall computational overhead of the Bloom filter. The number of hash functions needed to reduce false-positive errors for a given m and n can be represented by Equation 4.

$$k = \frac{m}{n} \ln 2 \quad (4)$$

In addition, multiple independent hash functions can be used for building a Bloom filter. In some embodiments, the hash functions are the core computational operations of the Bloom filter, and minimizing the computational overhead of these hash functions can be necessary for optimizing the overall Bloom filter computation. In some embodiments, the following Equation 5 may be used to generate an additional k hash value.

$$h_i(x) = h_1(x) + i*h_2(x) \bmod m \quad (5)$$

In this case, $0 \leq i \leq k-1$, and m may indicate the Bloom filter size.

In addition, space efficiency and insertion order independence can be the main considerations in using a Bloom filter data structure for supporting data integrity verification. The hash function used in the present disclosure will be described with reference to FIG. 2.

Figure 2:
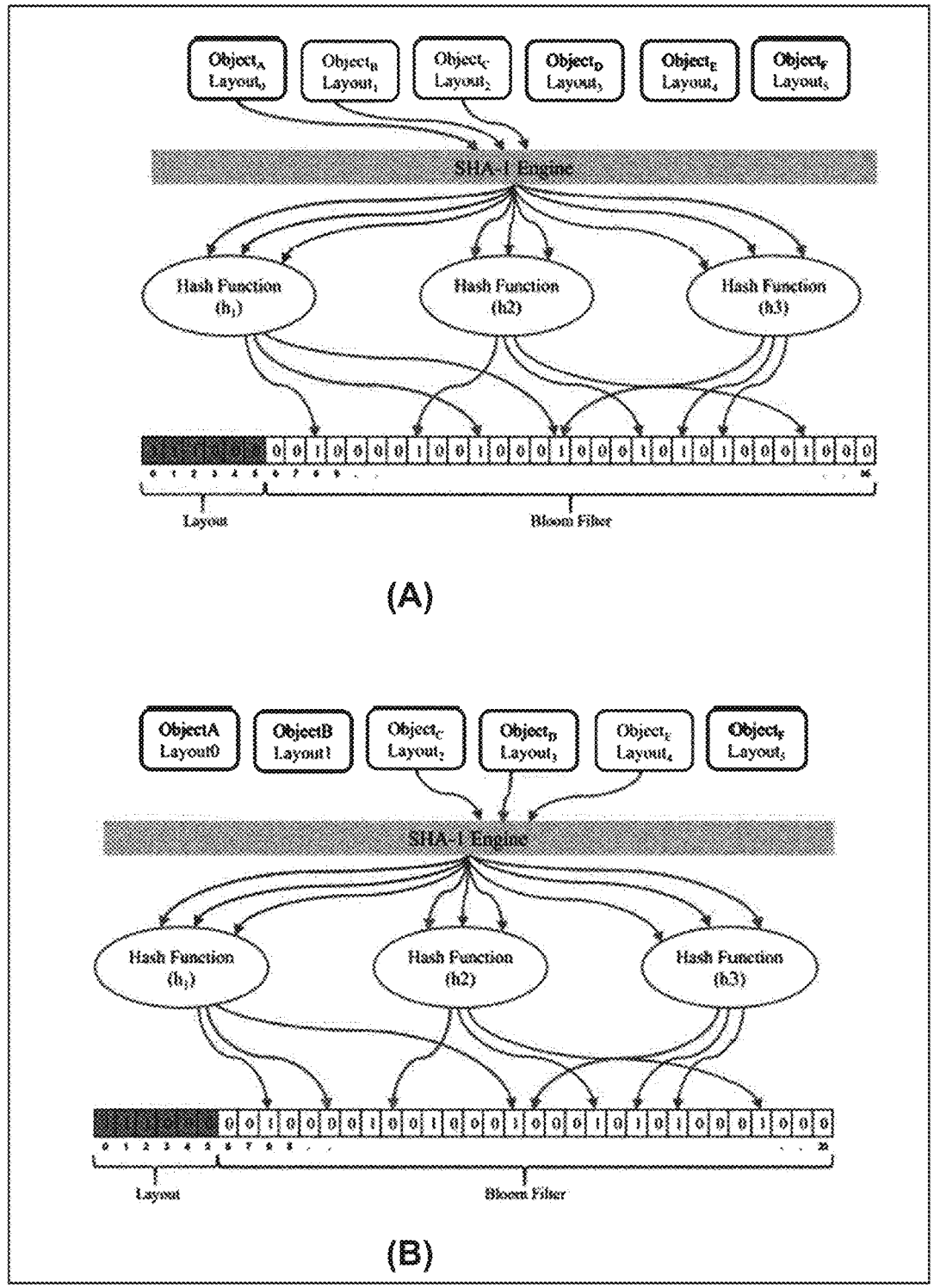
FIG. 2 is a diagram schematically showing a hash function one or more embodiments embodiment of the present disclosure.

FIG. 2 is a diagram schematically showing a hash function according to one or more embodiments of the present disclosure.

Referring to FIG. 2, in some embodiments, it will be described that the total number of objects in the dataset n=6, the number of hash functions k=3, and the total size of the Bloom filter as m=30. FIG. 2(A) illustrates an example where objects A, B, and C are inserted into the Bloom filter, and FIG. 2(B) illustrates an example where objects C, D, and E to exhibit success, fail, as well as false-positive match queries, respectively.

The Bloom filter array may be categorized into the Bloom filter and the layout sections, as shown in FIG. 2. Following successful object transfer and integrity verification, the layout section of the Bloom filter array may be filled with object layout information. On the other hand, the Bloom filter section of the array may be used to map the objects into k hash positions randomly by utilizing k independent hash functions. All (n+m) bits of the filter array are set to zero when the data transfer is initialized.

FIG. 2(A) describes an example of an insertion operation. As shown in FIG. 2(A), objects A, B, and C are inserted into the Bloom filter. For example, Hash functions $\{h_1, h_2,$ and $h_3\}$ can be employed on the hashed object data to uniformly map the objects into k random positions. The Bloom filter bits at positions {13, 16, and 20} can be set to 1 using the $\{h_1, h_2,$ and $h_3\}$ hash functions on hashed object A data. Additionally, bit {0} of the Bloom filter array can be set to 1 as the layout of Object A is zero. Similarly, bits at positions {1, 8, 28, and 32}, and {2, 20, 24, and 26} can be set to 1 for Object B and Object C, respectively.

FIG. 2(B) describes an example of a query operation. As shown in FIG. 2(B), an object membership can be presumed when all the k bits in the Bloom filter section, along with the layout bit in the layout sections, are set to 1.

As shown in FIG. 2(b), for Object C, the Bloom filter may return "Positive" for membership query as the hash positions {20, 24, and 26} along with its layout bit at position {2} is set to 1. The membership query of Object D may return "Negative" as the bit at position {11} is not set. On the other hand, Object E membership query may result in "Negative," despite the fact that the bits at positions {8, 28, and 32} are all set to 1, since the object layout bit at position {4} is not set. Without the layout information, Object E membership query may result in "False Positive" since the bits at positions {8, 28, and 32} are all set to 1. Hence, false-positive matches of the Bloom filter may be prevented by utilizing the object layout information in conjunction with the Bloom filter.

Figure 3:
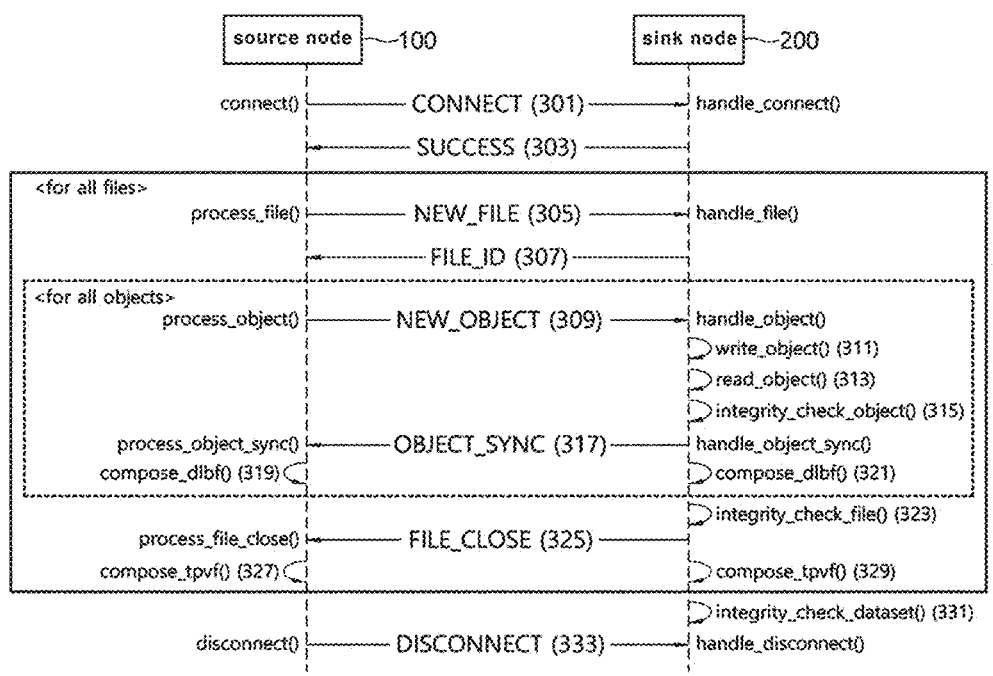
FIG. 3 is a flowchart showing communication messages between a source node and a sink node for data integrity verification according one or more embodiments of the present disclosure.

FIG. 3 is a flowchart showing an example of transfer and reception of a communication message between a source node and a sink node for data integrity verification according to one or more embodiments of the present disclosure.

Referring to FIG. 3, in step 301, the source node 100 requests a communication connection for transfer and reception of a communication message with the sink node 200. In step 303, the sink node 200 may connect communication with the source node 100 according to the request for the communication connection received in step 301.

In step 305, the source node 100 compiles a list of files to be transferred to the sink node 200 and then transfers a NEW_FILE request for each file to the sink node 200. In step 307, the sink node 200 adds a file descriptor for the corresponding file to the FILE_ID response based on the NEW_FILE request received from the source node 100. In step 307, the sink node 200 transmits the FILE_ID to which the file descriptor is added to the source node 100 in response to the NEW_FILE request.

In step 309, the source node 100 schedules transmission of all the objects included in the file and transfers the NEW_OBJECT request for each object to the sink node 200 while performing transmission of each object. In step 311, the sink node 200 writes the object received from the source node 100 to the parallel file systems (PFS) which is a storage of the sink node 200 and performs step 313. In step 313, the sink node 200 reads the written object again.

In step 315, the sink node 200 checks the integrity of the read object. To this end, the sink node 200 calculates a hash value of the object using a hash function. More specifically, the sink node 200 compares the hash value of the object received from the source node 100 according to the NEW_OBJECT request with the hash value computed in step 315. In step 317, the sink node 200 transfers the result of the comparison of the two hash values to the source node 100 by including the result of the comparison of the two hash values in the OBJECT_SYNC response which is a response to the NEW_OBJECT request. As a result of the comparison of the two hash values, when the two hash values are the same, the sink node 200 determines that the integrity verification of the object is successful.

Accordingly, in step 319, the source node 100 may update the DLBF and in step 321, the sink node 200 may update the DLBF. On the contrary, when the hash values are different from each other, the sink node 200 requests the source node 100 to re-transfer the object whose integrity verification has failed so that the source node 100 can schedule re-transfer of the corresponding object. In some embodiments, the steps 309 to 321 may be repeatedly performed until the transfer and integrity verification of at least one object included in the file is completed.

Subsequently, in step 323, the sink node 200 checks the integrity of the file. More specifically, the sink node 200 calculates a hash value of a file level from the updated DLBF. In step 325, when all objects included in the file are successfully received, the sink node 200 compares the hash value of the file level with the hash value of the file level received from the NEW_OBJECT request of the last object and responds with the FILE_CLOSE. In some embodiments, when the hash values of the file level are the same, the sink node 200 determines that the integrity verification for the file is successful.

Accordingly, in step 327, the source node 100 may update the TPBF and in step 329, the sink node 200 may update the TPBF. On the contrary, when the hash values of the file level are different, the sink node 200 may request the source node 100 to re-transfer the file whose integrity verification fails so that the source node 100 can schedule re-transfer of the corresponding file. In some embodiments, steps 305 to 329 may be repeatedly performed until transfer and integrity verification of at least one file included in the data set are completed.

Subsequently, in step 331, the sink node 200 may perform the integrity verification of the data set level after successfully receiving all the files included in the data set. More specifically, the sink node 200 calculates a hash value of the data set level from the updated TPBF. When successfully receiving all the files included in the data set, the sink node 200 compares the hash value of the data set level with the hash value of the data set level received from the NEW_FILE request of the last file. In some embodiments, when the hash values of the data set level are the same, the sink node 200 determines that the integrity verification of the data set is successful. As described above, when the integrity verification of the data set is successfully completed, the source node 100 transfers a DISCONNECT request to the sink node 200 in step 333.

Figure 4:
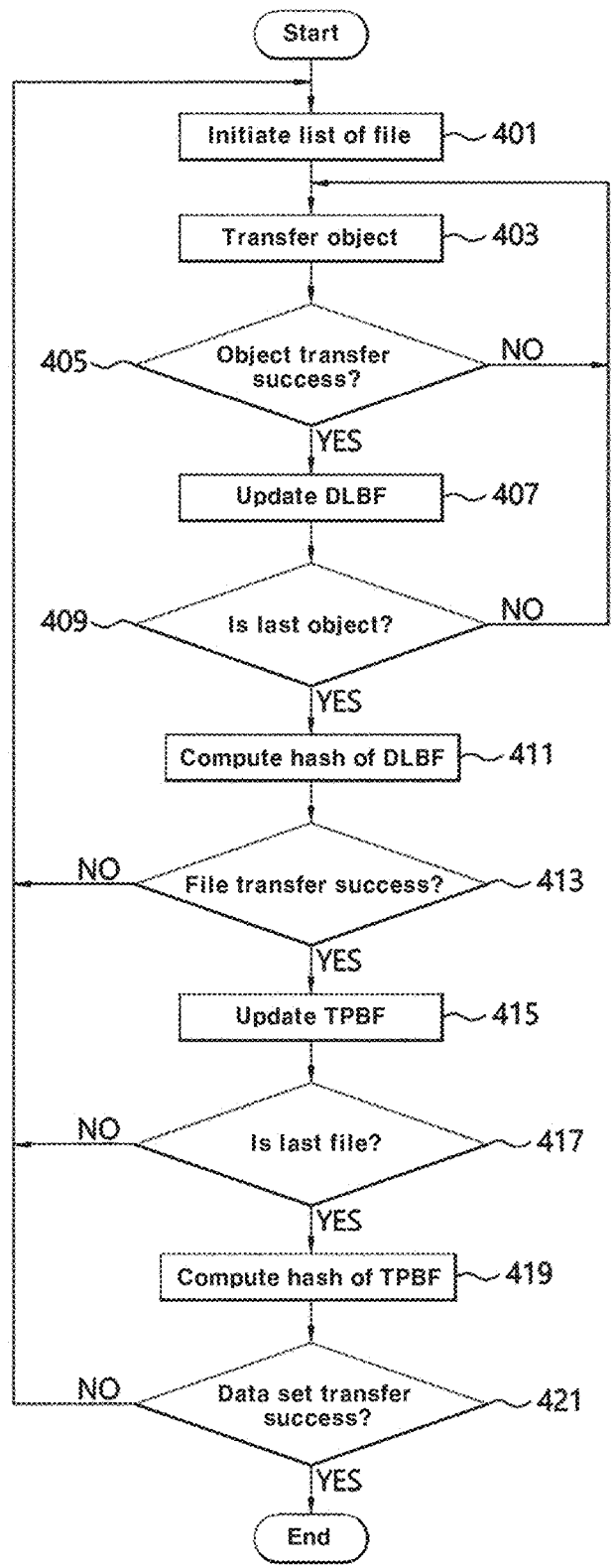
FIG. 4 is a flowchart showing an operation of a source node for data integrity verification according to one or more embodiments of the present disclosure.

FIG. 4 is a flowchart showing an example of an operation of a source node for data integrity verification one or more embodiments embodiment of the present disclosure.

Referring to FIG. 4, in step 401, the source node 100 compiles and initiates a list of files to be transferred to the sink node 200 through which communication is connected, and then performs step 403. In step 403, the source node 100 transfers at least one object included in the file to the sink node 200. More specifically, the object handler of the source node 100 reads the object data written in the storage included in the source node 100 and calculates a hash value of the object using a SHA1 engine (hereinafter, referred to as a hash function). The source node 100 transfers the computed hash value of the object and the object to the sink node 200.

In step 405, the source node 100 checks whether the object is successfully transferred. More specifically, the source node 100 receives the integrity check result of the object from the sink node 200 after transferring the hash value of the object and the object to the sink node 200. The source node 100 may check whether the object is successfully transferred based on the received integrity check result. As a result of checking in step 405, when the object is successfully transferred, the source node 100 performs step 407, and when the object is not successfully transferred, the source node 100 may return to step 403 and perform step 403 again. In some embodiments, the source node 100 performs scheduling for re-transferring the object failing to be transferred to the sink node 200.

In step 407, the source node 100 updates the DLBF based on the hash value and performs step 409. In step 409, the source node 100 checks whether the object transferred in step 403 is the last object. As a result of checking in step 409, when it is not the last object, it returns to step 403 and steps 403 to 409 are performed again, and when it is the last object, step 411 is performed. In this case, in order to update the DLBF, the source node 100 may use a k-hash function for generating a k-hash positions. In addition, when the integrity verification of the object is successful, the k-hash position together with the object layout bit of the DLBF can be set to 1, and a file level signature can be generated by file level DLBF hashing when all the objects of the logical file are transferred.

In step 411, the source node 100 successfully transfers all the objects comprised in the logical file as in steps 403 to 409, and then computes a hash value of a file level from the updated DLBF. In step 413, the source node 100 checks whether the file is successfully transferred. More specifically, the source node 100 transfers the hash value of the file level and the file to the sink node 200, and then receives the integrity check result of the file from the sink node 200. The source node 100 may check whether the file is successfully transferred based on the received integrity check result. When the file is successfully transferred as the check result of step 413, the source node 100 may perform step 415, and when the file is not successfully transferred, the source node 100 may return to step 401 and perform steps 401 to 413 again. In this case, when the hash value of the file level does not match, that is, if the transfer of the file fails in the source node 100 and the sink node 200, the source node 100 may mark the file as corrupted and schedules the file for re-transfer.

In step 415, the source node 100 updates the TPBF based on the hash value of the file level and performs step 417. In this case, the source node 100 updates the TPBF using the hash value of the file level, that is, the hash value of the DLBF. If the file transfer and the integrity verification are successful, the k-hash position of the TPBF is set to 1, and after transferring all the files of the data set, the data set level signature is computed in the TPBF.

In step 417, the source node 100 checks whether the file transferred to the sink node 200 in step 413 is the last file. As a result of checking in step 417, when the file is not the last file, the source node 100 returns to step 401, and steps 401 to 417 are performed again, and when the file is the last file, step 419 is performed.

In step 419, the source node 100 successfully transfers all files comprised in the data set and then computes the hash value of the data set from the updated TPBF. In step 421, the source node 100 checks whether the transfer of the data set is successful. More specifically, the source node 100 transfers the hash value of the data set and the data set to the sink node 200, and then receives the integrity check result of the data set from the sink node 200. The source node 100 may check whether the transfer of the data set is successful based on the received integrity check result. When the file transfer is successful as the check result of step 421, the source node 100 may end the corresponding process, and when the transfer of the data set is not successful, the source node 100 may return to step 401 and perform steps 401 to 421 again. In this case, when the hash value of the data set does not match, that is, if the transfer of the data set fails in the source node 100 and the sink node 200, the source node 100 schedules the data set for re-transfer.

Figure 5:
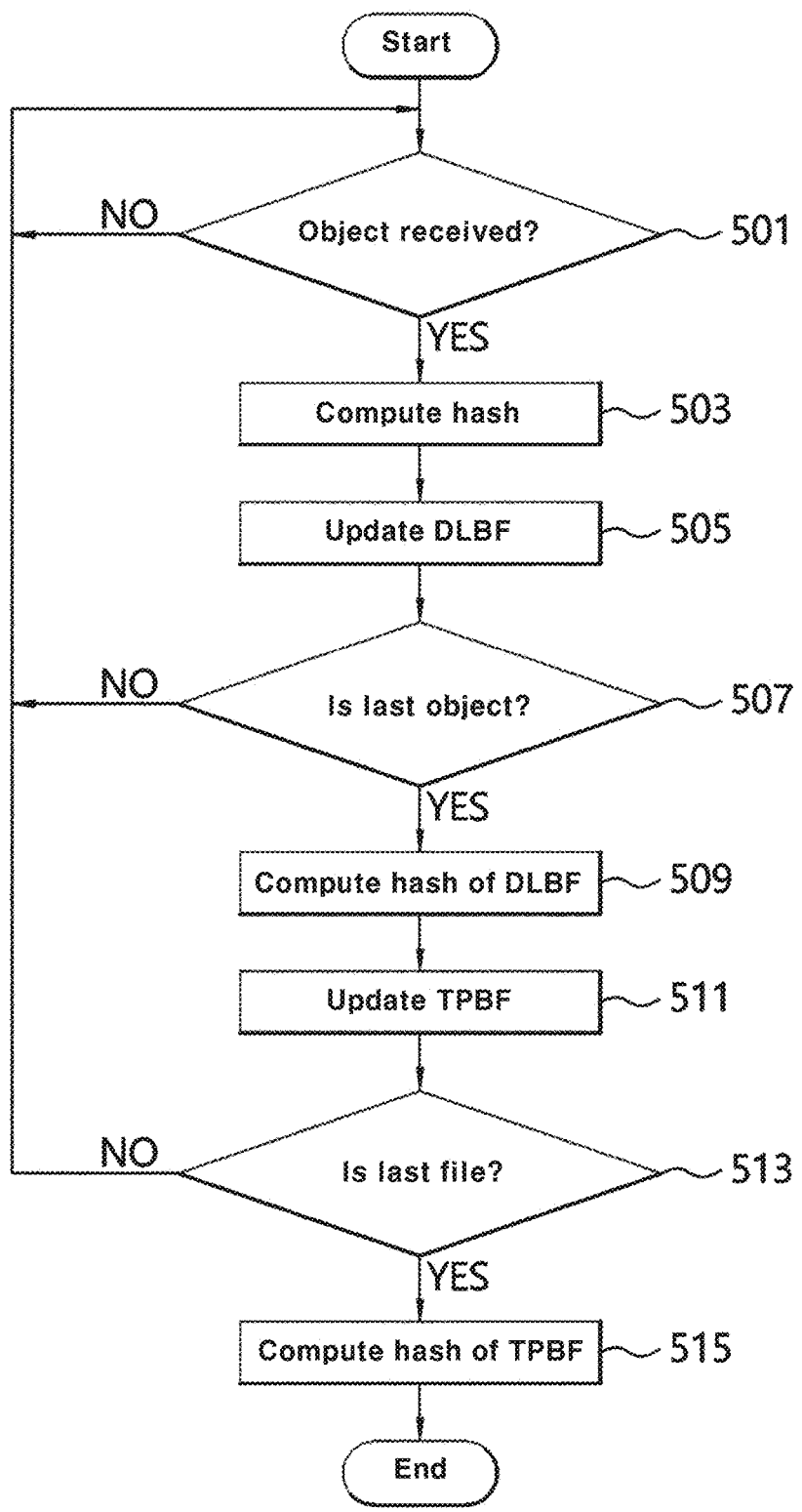
FIG. 5 is a flowchart showing an operation of a sink node for data integrity verification according to one or more embodiments of the present disclosure.

FIG. 5 is a flowchart showing an operation of a sink node for data integrity verification one or more embodiments embodiment of the present disclosure.

Referring to FIG. 5, in step 501, the sink node 200 performs step 503 when an object is received from the source node 100, and waits for reception of the object when the object is not received. In step 503, the sink node 200 computes the hash value of the received object. More specifically, the sink node 200 writes the object received from the source node 100 to the parallel file system (PFS), which is the storage of the sink node 200, and reads the written object again. The sink node 200 checks the integrity of the read object. To this end, the sink node 200 calculates a hash value for the object using a hash function of SHA1. The sink node 200 compares the hash value of the object received from the source node 100 with the computed hash value of the object. As a result of comparing the hash values, the sink node 200 determines that the integrity verification of the object is successful, and transfers it to the source node 100 when the hash values are the same. On the contrary, when the hash values are different, the object is marked as corrupted, and the sink node 200 requests the source node 100 to re-transfer the corresponding object.

In step 505, the sink node 200 updates the DLBF and performs step 507. In step 507, the sink node 200 performs step 509 when the object received in step 501 is the last object. When, it is not the last object, it returns to step 501 and steps 501 to 507 may be repeatedly performed until reception of all the objects comprised in the file is completed.

In step 509, the sink node 200 computes a hash value of a file level from the updated DLBF. When all the objects comprised in the file are successfully received, the sink node 200 compares a hash value of the file level with the hash value of the file level received in the source node 100. When the hash values of the file level are the same, the sink node 200 determines that the integrity verification of the file is successful. On the contrary, when the hash values of the file level are different, the sink node 200 may request the source node 100 to re-transfer the file whose integrity verification fails so that the source node 100 can schedule re-transfer of the corresponding file.

Subsequently, in step 511, the sink node 200 updates the TPBF and performs step 513. In step 513, the sink node 200 performs step 515 when the file transferred from the source node 100 is the last file among the files comprised in the data set, the sink node 200 performs step 515. When it is not the last file, it returns to step 501 and until the reception of all the files comprised in the data set is completed, the sink node 200 repeatedly performs steps 501 to 513.

In step 515, the sink node 200 computes a hash value of a data set level from the updated TPBF. When all the files comprised in the data set are successfully received, the sink node 200 compares a hash value of the data set level with the hash value of the data set level received in the source node 100. When the hash values of the data set level are the same, the sink node 200 determines that the integrity verification of the data set is successful. As such, when the integrity verification of the data set is successfully completed, the sink node 200 may terminate the communication connection with the source node 100.

Hereinafter, the memory overhead of the two-phase Bloom filter according to the present disclosure is compared with the memory overhead of the conventional Bloom filter-based data integrity solution.

Given the number of elements to be inserted (n), the desired false-positive probability ($\epsilon$) and the number of hash functions (k), the number of bits required for the Bloom filter (m), can be computed by substituting the value of k from Equation (4) in the probability expression, Equation (3), as in Equation (6) below.

$$\epsilon = \left(1 - e\left(\frac{m}{n}\ln 2\right)\frac{n}{m}\right)^{\frac{m}{n}\ln 2} \tag{6}$$

In addition, Equation 6 may be simplified, as shown in Equation 7 below.

$$\ln \epsilon = -\frac{m}{n}\ln 2^2 \tag{7}$$

That is, the optimal number of bits required is as shown in Equation 8 below.

$$m = -\frac{n\ln \epsilon}{\ln 2^2} \tag{8}$$

Considering a dataset with a total number of files (N), each with objects or blocks (S), for a given false-positive probability, the minimum number of bits required for the standard Bloom-filter-based data integrity may be represented as Equation 9 below.

$$m = -\frac{(N*S)\ln\epsilon}{\ln 2^2} \quad (9)$$

If it is assumed that S==N and ignoring the constant values, approximate the number of bits required may be computed using Equation 10 below.

$$m \approx (N^2) \quad (10)$$

Whereas, for the two-phase Bloom filter, the total number of bits required are the sum of bits required for both DLBF and TPBF Bloom filters, and is represented by Equation (11) below. Equation (11) may be derived by substituting n at each phase of the Bloom filter in Equation (7) below.

$$m = -\left(\frac{(S*C)\ln\epsilon}{\ln 2^2}\right) + -\left(\frac{(N)\ln\epsilon}{\ln 2^2}\right) \quad (11)$$

In this case, C is number of active file transfers, and assuming that S==N and C<<N, and ignoring the constant values, an approximation of the number of bits required may be computed using Equation (12) below.

$$m = -\frac{(2N)\ln\epsilon}{\ln 2^2} \approx N \quad (12)$$

As shown in Equation (12), it can be seen that the number of bits required for the two-phase Bloom filter are linearly proportional to the number of elements in the dataset, while Equation (10) can be seen that the number of bits required by the conventional Bloom-filter-based data integrity solution has a quadratic relation with the number of elements in the dataset. Accordingly, it can be seen that the two-phase Bloom filter according to the present disclosure efficiently reduces memory and storage requirements.

The embodiments of the present disclosure disclosed in the specification and the drawings are merely provided by way of illustrating specific examples for easy description of the technical content of the present disclosure and helping to understand the present disclosure, and are not intended to limit the scope of the present disclosure. Accordingly, it should be interpreted that all changes or modifications derived from the technical idea of the present disclosure fall within the scope of the present disclosure in addition to the embodiments disclosed herein.

The elements of a method, process, routine, or algorithm described in connection with the embodiments disclosed herein can be embodied directly in specifically tailored hardware, in a specialized software module executed by an image processing system, or in a combination of the two. A software module can reside in random access memory (RAM) memory, flash memory, read only memory (ROM), erasable programmable read-only memory (EPROM), electrically erasable programmable read-only memory (EEPROM), registers, hard disk, a removable disk, a compact disc read-only memory (CD-ROM), or other form of a non-transitory computer-readable storage medium. A storage medium can be coupled to the image processing system such that the image processing system can read information from, and write information to, the storage medium. In the alternative, the storage medium can be integral to the image processing system. The DSDN node and the storage medium can reside in an application specific integrated circuit (ASIC). The ASIC can reside in an access device or other monitoring device. In the alternative, the DSDN node and the storage medium can reside as discrete components in an access device or other item processing device. In some embodiments, the method may be a computer-implemented method performed under the control of a computing device, such as an access device or other item processing device, executing specific computer-executable instructions.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without other input or prompting, whether these features, elements and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y, Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each is present.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

As used herein, the terms "determine" or "determining" encompass a wide variety of actions. For example, "determining" may include calculating, computing, processing, deriving, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing, and the like.

As used herein, the term "selectively" or "selective" may encompass a wide variety of actions. For example, a "selective" process may include determining one option from multiple options. A "selective" process may include one or more of: dynamically determined inputs, preconfigured inputs, or user-initiated inputs for making the determination. In some embodiments, an n-input switch may be included to provide selective functionality where n is the number of inputs used to make the selection.

As used herein, the terms "provide" or "providing" encompass a wide variety of actions. For example, "providing" may include storing a value in a location for subsequent retrieval, transmitting a value directly to the recipient, transmitting or storing a reference to a value, and the like. "Providing" may also include encoding, decoding, encrypting, decrypting, validating, verifying, and the like.

As used herein, the term "message" encompasses a wide variety of formats for communicating (e.g., transmitting or receiving) information. A message may include a machine readable aggregation of information such as an XML document, fixed field message, comma separated message, or the like. A message may, in some embodiments, include a signal utilized to transmit one or more representations of the information. While recited in the singular, it will be understood that a message may be composed, transmitted, stored, received, etc. in multiple parts.

All references cited herein are incorporated herein by reference in their entirety. To the extent publications and patents or patent applications incorporated by reference contradict the disclosure contained in the specification, the specification is intended to supersede and/or take precedence over any such contradictory material.

The term "comprising" as used herein is synonymous with "including," "containing," or "characterized by," and is inclusive or open-ended and does not exclude additional, unrecited elements or method steps.

The above description discloses several methods and materials according to embodiments of the present invention. Embodiments of this invention are susceptible to modifications in the methods and materials, as well as alterations in the fabrication methods and equipment. Such modifications will become apparent to those skilled in the art from a consideration of this disclosure or practice of embodiments of the invention disclosed herein. Consequently, it is not intended that this invention be limited to the specific embodiments disclosed herein, but that it covers all modifications and alternatives coming within the true scope and spirit of the invention as embodied in the attached claims.

What is claimed is:

1. A method for verifying end-to-end data integrity, the method comprising:
   transferring, with a source node, at least one data set to a sink node;
   verifying, with the sink node, integrity of at least one object comprised in the data set based on a data and layer-aware Bloom filter (DLBF);
   verifying, with the sink node, integrity of at least one file comprised in the data set based on a two-phase Bloom filter (TPBF); and
   verifying, by the sink node, integrity of the data set based on the integrity verification of the object and the file.

2. The method of claim 1, wherein verifying the integrity of the at least one object comprises:
   computing, with the sink node, a hash value of the object using a hash function; and
   comparing, with the sink node, the computed hash value with a hash value computed in the source node.

3. The method of claim 2, further comprising:
   requesting, with the sink node, the source node to re-transfer the object when the hash values are different from each other.

4. The method of claim 2, further comprising:
   verifying, with the sink node, the integrity of the object when the hash values are the same.

5. The method of claim 4, further comprising:
   updating, with the sink node, the DLBF when the hash values are the same; and
   updating, with the source node, the DLBF when the hash values are the same.

6. The method of claim 5, wherein verifying the integrity of the at least one file further comprises:
   computing, with the sink node, a hash value of a file level from the DLBF; and
   comparing, with the sink node, the computed hash value of the file level with a hash value of a file level computed in the source node.

7. The method of claim 6, further comprising:
   requesting, with the sink node, the source node to re-transfer the file when the hash values of the file level are different from each other.

8. The method of claim 6, further comprising:
   verifying, with the sink node, the integrity of the file when the hash values of the file level are the same.

9. The method of claim 8, further comprising:
   updating, with the sink node, the DLBF when the hash values of the file level are the same; and
   updating, with the source node, the DLBF when the hash values of the file level are the same.

10. The method of claim 9, wherein verifying the integrity of the data set further comprises:
    computing, with the sink node, a hash value of a data set level from the TPBF; and
    comparing, with the sink node, the hash value of the computed data set level with a hash value of a data set level computed in the source node.

11. The method of claim 10, further comprising:
    requesting, with the sink node, the source node to re-transfer the data set when the hash values of the data set level are different from each other.

12. The method of claim 10, further comprising:
    verifying, with the sink node, the integrity of the at least one data set when the hash values of the data set level are the same.

13. A system for verifying end-to-end data integrity, the system comprising:
    a source node configured to transfer at least one data set; and
    a sink node configured to:
      verify integrity of at least one object comprised in the data set received from the source node based on a data and layer-aware Bloom filter (DLBF) through communication with the source node,
      verify integrity of at least one file comprised in the data set based on a two-phase Bloom filter (TPBF), and
      verify integrity of the data set based on the integrity verification of the object and the file.

14. The system of claim 13, wherein the sink node is configured to compare a hash value of the object computed using a hash function with a hash value computed in the source node.

15. The system of claim 14, wherein the sink node is configured to:
    request the source node to re-transfer the object when the hash values are different from each other, and
    verify the integrity of the object when the hash values are the same.

16. The system of claim 15, wherein the sink node is configured to compare a hash value of a file level computed from the DLBF updated with a hash value of a file level computed from the DLBF updated in the source node as the hash values are the same.

17. The system of claim 16, wherein the sink node is configured to:
    request the source node to re-transfer the file when the hash values of the file level are different from each other, and verify the integrity of the file when the hash values of the file level are the same.

18. The system of claim 17, wherein the sink node is configured to compare a hash value of a data set level computed from the TPBF updated with a hash value of a data set level computed from the TPBF updated in the source node as the hash values of the file level are the same.

19. The system of claim 18, wherein the sink node is configured to:
request the source node to re-transfer the data set when the hash values of the data set level are different from each other, and
verify the integrity of the data set when the hash values of the data set level are the same.

* * * * *